(12) United States Patent
Francescon

(10) Patent No.: US 9,176,162 B2
(45) Date of Patent: Nov. 3, 2015

(54) POSITION ENCODER

(71) Applicant: SICK STEGMANN GmbH, Donaueschingen (DE)

(72) Inventor: Massimo Francescon, Turin (IT)

(73) Assignee: SICK STEGMANN GMBH, Donaueschingen (DE)

( * ) Notice: Subject to any disclaimer, the term of this patent is extended or adjusted under 35 U.S.C. 154(b) by 69 days.

(21) Appl. No.: 13/890,559

(22) Filed: May 9, 2013

(65) Prior Publication Data
US 2013/0335063 A1 Dec. 19, 2013

(30) Foreign Application Priority Data
Jun. 15, 2012 (EP) .................................... 12172154

(51) Int. Cl.
*G01P 3/66* (2006.01)
*G01D 5/244* (2006.01)
*G01P 3/487* (2006.01)
*G01P 3/488* (2006.01)
*G01P 15/08* (2006.01)
*G01P 13/04* (2006.01)

(52) U.S. Cl.
CPC *G01P 3/66* (2013.01); *G01D 5/244* (2013.01); *G01P 3/487* (2013.01); *G01P 3/488* (2013.01); *G01P 13/045* (2013.01); *G01P 15/0888* (2013.01)

(58) Field of Classification Search
CPC ....... G01P 13/045; G01P 15/125; G01P 3/44; G01P 15/0888; G01P 3/487; G01P 3/488; G01P 3/66
USPC ........................................................ 324/176
See application file for complete search history.

(56) References Cited

U.S. PATENT DOCUMENTS

| | | | | |
|---|---|---|---|---|
| 4,214,483 A | * | 7/1980 | Young | 324/176 |
| 4,355,364 A | * | 10/1982 | Gudat | 702/145 |
| 4,715,009 A | * | 12/1987 | Bohmler et al. | 702/147 |
| 5,983,188 A | * | 11/1999 | Roessle | 704/275 |
| 8,138,771 B2 | * | 3/2012 | Nurmi | 324/654 |
| 2006/0001388 A1 | * | 1/2006 | Stork et al. | 318/66 |
| 2007/0254776 A1 | * | 11/2007 | Wakashiro et al. | 477/181 |
| 2010/0303460 A1 | * | 12/2010 | Hunter | 398/25 |
| 2011/0298448 A1 | * | 12/2011 | Foletto et al. | 324/207.13 |
| 2011/0298449 A1 | * | 12/2011 | Foletto et al. | 324/207.13 |

FOREIGN PATENT DOCUMENTS

EP 2154487 A2 2/2010

OTHER PUBLICATIONS

European Search Report issued Dec. 19, 2012, for corresponding application EP 12 172 154.2.

* cited by examiner

*Primary Examiner* — Jermele M Hollington
*Assistant Examiner* — Christopher McAndrew
(74) *Attorney, Agent, or Firm* — Nath, Goldberg & Meyer; Jerald L. Meyer

(57) ABSTRACT

Position encoder for measuring a position containing a sensor 2, providing electrical signals representing the angular position, a measuring device for measuring the electrical signals and outputting at least one electrical position signal representing the angular position and signal processing means 3, processing the position signal, the signal processing means 3 exhibiting an adaptive filter comprising at least a speed estimator 5 outputting an estimated speed and connected in parallel a speed limiter 7 that depending from the estimated speed limits a change in the position signal.

14 Claims, 3 Drawing Sheets

POSITION ENCODER

Figure 1:
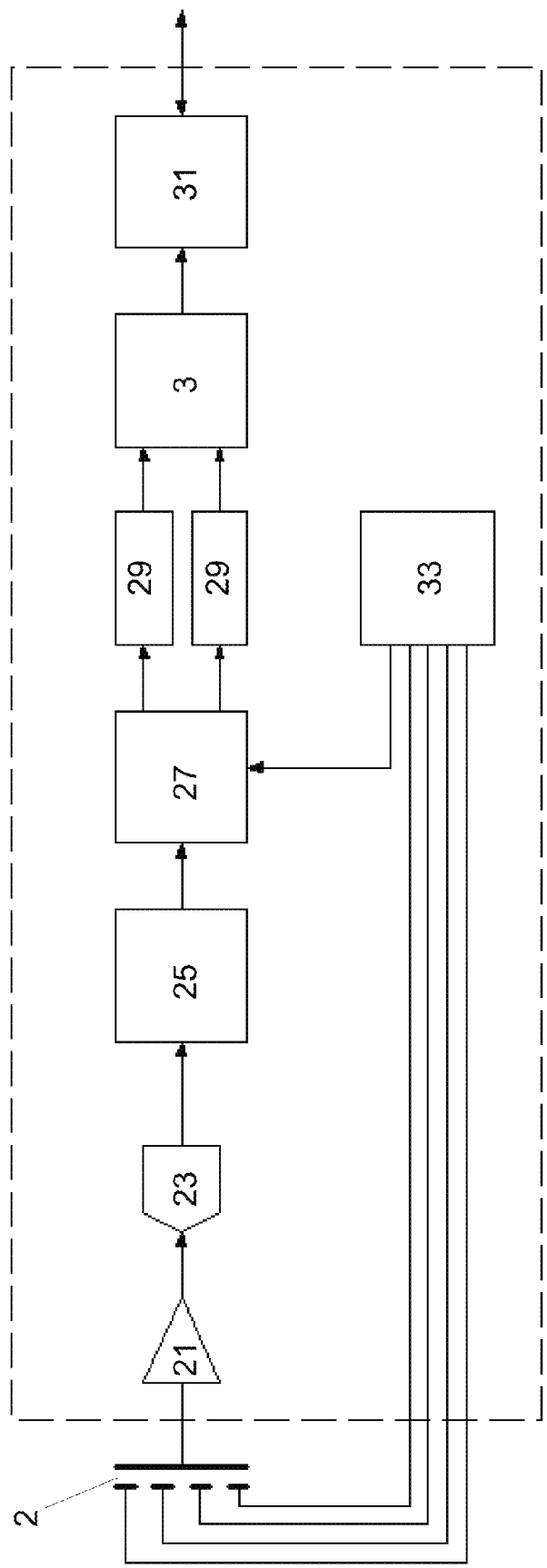

The present invention relates to position encoders, particularly linear and rotary position encoders for determining a linear or angular position, and to signal processing means for such encoders, particularly means for reducing noise and disturbance in the position signal gained. In particular the present invention relates to a dynamic filter providing the afore-mentioned signal processing.

In numerous technical applications, it is important to obtain information on the phase of a rotating system at a given point of time, more specifically its angular position at said point of time. To obtain this information, one or more sensors are provided that generate data that are indicative of said phase and the data generated by the sensors are evaluated in order to obtain the desired phase information. The combination of sensors and hardware for the evaluation represents a device for controlling a rotating system. Specifically, position encoders, more specifically linear position encoders and rotary position encoders, belong to this class of devices.

The present invention is particularly advantageous in connection with capacitive position encoders. Capacitive position encoders derive the linear or angular position from a number of capacitances that change according to the position. A sensor transduces the capacitances into a electrical signal representing the position.

There are different working principles of capacitive position encoders. One is that the plates of parallel arranged capacitors stay fixed wherein a dielectric modulator is moving according to the physical position to be measured. A series of phase shifted excitation signals is applied to the capacitances and are modulated according to the movement or the position of the dielectric. The resulting signal is synchronous with the excitation and the phase of its fundamental harmonic is proportional to e.g. the angle to be measured.

From the fundamental harmonic two orthogonal signals are obtained by applying bandpass filtering and a Fourier transformation. In other words these signals are proportional to sine and cosine of the position signal, e.g. the measuring angle.

As position encoders often are part of a regulating loop, there is a demand for low noise on the one hand and low lag on the other hand. However, as low system bandwidth in order to hold system noise small introduces delay due to processing time, these represent conflicting requirements.

It is an object of the present invention to provide an improved position encoder that overcomes the drawbacks of the state of the art.

According to the present invention a position encoder for measuring a position contains a sensor, providing physical signals representing the position, a measuring device for measuring the physical signals and outputting at least an electrical position signal representing the position and signal processing means, processing the position signal wherein the signal processing means exhibit an adaptive filter comprising at least a speed estimator outputting an estimated speed and connected in parallel a speed limiter that depending from the estimated speed limits a change in the position signal.

According to the above it is possible to limit the changes in the position signal according to the estimated moving speed of the encoder. With knowledge about the maximum speed that is possible it is further possible to exclude noise or disturbance introduced signal spikes in the speed calculation.

Calculation of the current speed in the speed estimator can be easily done by differentiation of the position signal. It is thus advantageous when the encoder exhibits a first differentiator, calculating the current speed from the position signal.

The differentiation for example may be calculated using a delay line that is fed with position samples and calculating the differences between the position samples. An accurate measurement with not to much noise may be obtained with a queue of 4 samples for examination.

The speed estimator further may comprise a dynamic slope filter that is connected in series to the first differentiator and provides a noise reduced speed signal. By filtering at least changes in speed that exceed the maximum possible acceleration the signal obtained can be improved. This improvement may be reached by a single po1 filter working in the time discrete domains.

In an advantageous embodiment the the speed limiter comprises a dynamic clamping means the transfer function of the clamping means depending on the output of the speed estimator and limiting changes in the position signal depending on the estimated speed.

By limiting the range of possible changes of the position signal according to the speed obtained form the speed estimator it is possible on the one hand to allow great changes at high speeds and on the other hand to narrow the corridor for possible changes at low speeds and thus to discard excessive variations. The clamping will virtually ad no lag and is particularly effective in cases of strong noise or isolated spikes.

The clamping means is more effective, if it does not work on the position signal itself but on its deviation, the speed or the slope of the position signal. It is thus advantageous if the speed limiter comprises a second differentiator that receives the position signal and is connected to the input of the clamping means.

As set out above the clamping limits can be calculated on the basis of the known slope measurement. However as these values are not very critical even at high accelerations the clamping limits, i.e. the maximum and the minimum slope may be set to +/−20% of the current slope and may further include a correction factor of e.g. +/−0.003.

In order to output not the slope or the speed but a position signal, it is necessary to integrate the clamped signal. The speed limiter therefore may further comprise an integrator connected in series to the clamping means. The integrator consequently, outputting a noise reduced position signal. It has to be mentioned that signals not exceeding the maximum or minimum slope, i.e. not exceeding the clamping limits, will be restored without any changes, while slopes considered excessive will be limited.

As generally the clamping or clipping of the slope signals is not symmetrical, long term errors may occur. It is therefore advantageous if the the signal processing means further comprises a long term correction means compensating long term errors occurring within the speed limiter.

In a preferred embodiment the long term correction means are embodied as a closed loop comprising a proportional plus integral controller. The closed loop being fed by the current position error that can be obtained by subtracting the input position signal from the output position signal of the speed limiter.

By using an proportional plus integral controller, the integral branch can null errors also in case of linearly varying speed or constant acceleration, and the proportional branch may be trimmed to ensure the stability of the loop.

It is furthermore advantageous, if the the transfer function of the low pass filter depends on the long term error occurring in the speed limiter.

According to an embodiment the signal processing means may further comprise a lag compensator, compensating a signal delay occurring within the clamping means.

The lag compensator is able to compensate the lag occurring within the clamping means. Especially the availability of a speed estimation allows good compensation of the delays because it is possible to do a kind of extrapolation of the position signal according to the estimated speed.

According to a further embodiment the lag compensator adds the noise reduced and long term compensated position signal and the noise reduced speed signal, the noise reduced speed signal preferably being multiplied by a first predefined factor.

The addition of the noise reduced and long term compensated position signal and the noise reduced speed signal provides a kind of extrapolation. The value of the predefined first factor is determined by the components used in the signal processing means, manly depending on the bandwidth limitation of the analog filters and the length of the sample queues, e.g. of the Fourier transformation or the notch filter used. Concerning the delays depending on the length of the filter queues it has be evaluated that the influence on the second factor is half the queue length of e.g. the notch filter or the Fourier transformation.

Other time related effects such as the line delay can be compensated by adopting the value of the first predefined factor.

If the above-mentioned influences, e.g. the bandwidth of the analog filters or the length of the sample queues may vary, it is advantageous, if the first predefined factor is dynamically adopted according to these variations.

The afore-mentioned dynamic slope filter may be embodied as a dynamic low pass filter performing a single pole filtering, the time constant of the low pass filter depending on a long term position error occurring in the speed limiter. This way it is possible to keep the lag to a minimum while high resolution and stable results are possible during low speed or standstill.

Preferably the time constant depends on the absolute value of the long term position error, it is thus preferable if the digital signal processing means further comprise absolute value means processing the long term error signal and feeding it to the dynamic low pass filter, preferably multiplied by a predefined second factor. The predefined second factor may be determined by simulations or calculations in order to optimize both, noise filtering and lag.

In a further embodiment the signal processing means further comprise a dynamic position filter, receiving the noise reduced position signal and filtering it dependent on the of the current speed signal, preferably multiplied by a predefined third factor.

Best result for dynamic position filtering have been achieved, when the time constant of the filter depends on output of squaring means receiving the estimated speed and outputting the square of it. It thus has been possible to achieve high noise rejection during low speeds and standstill while higher noise values are accepted during acceleration and high speeds.

Figure 2:
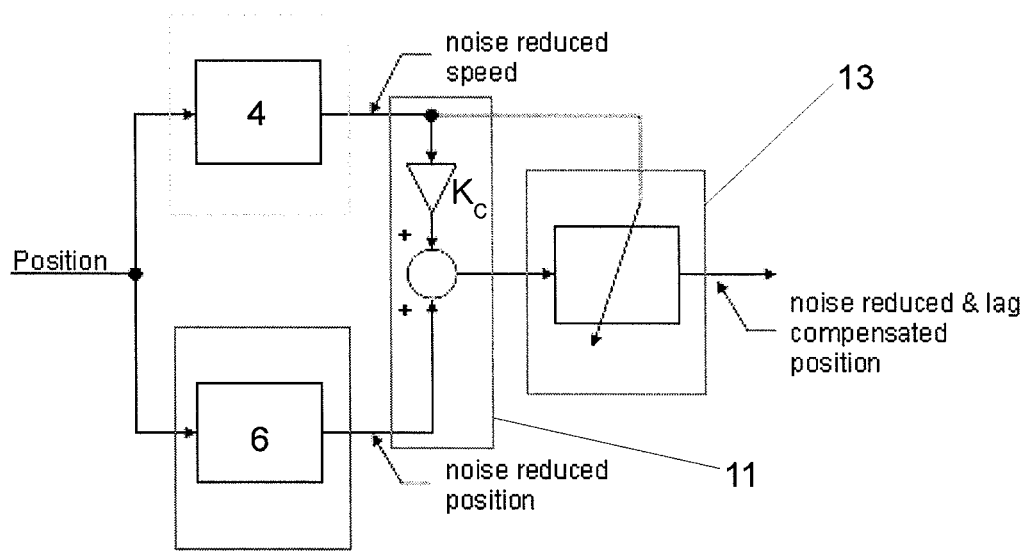
Figure 3:
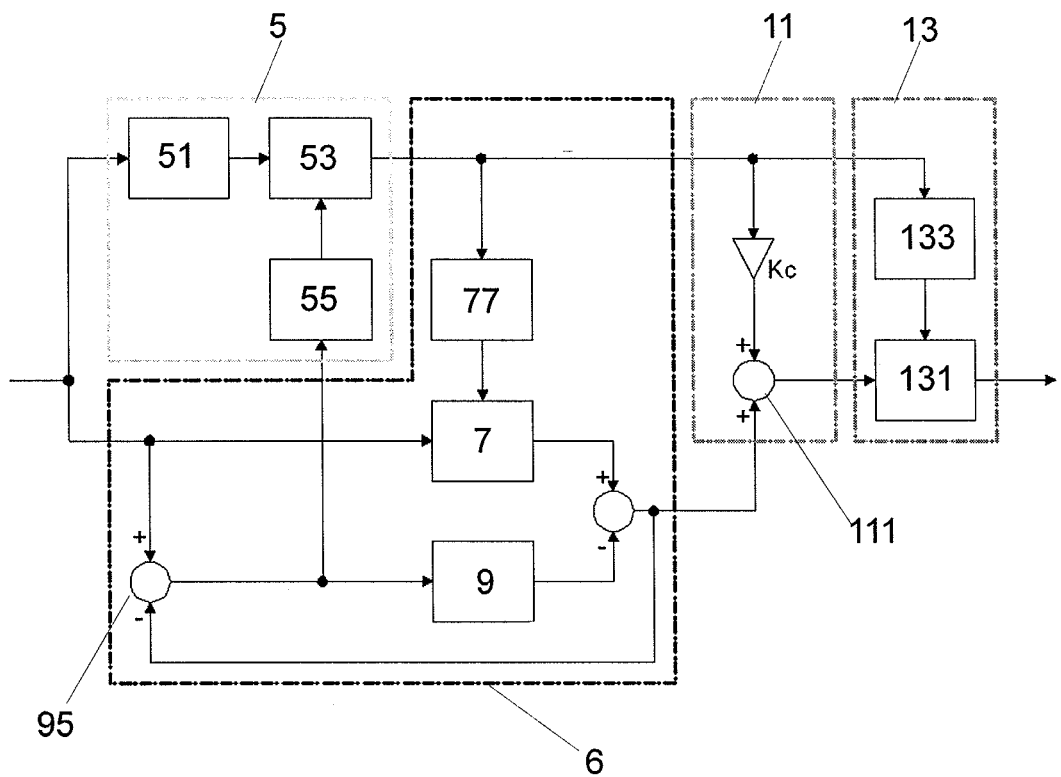
Figure 4:
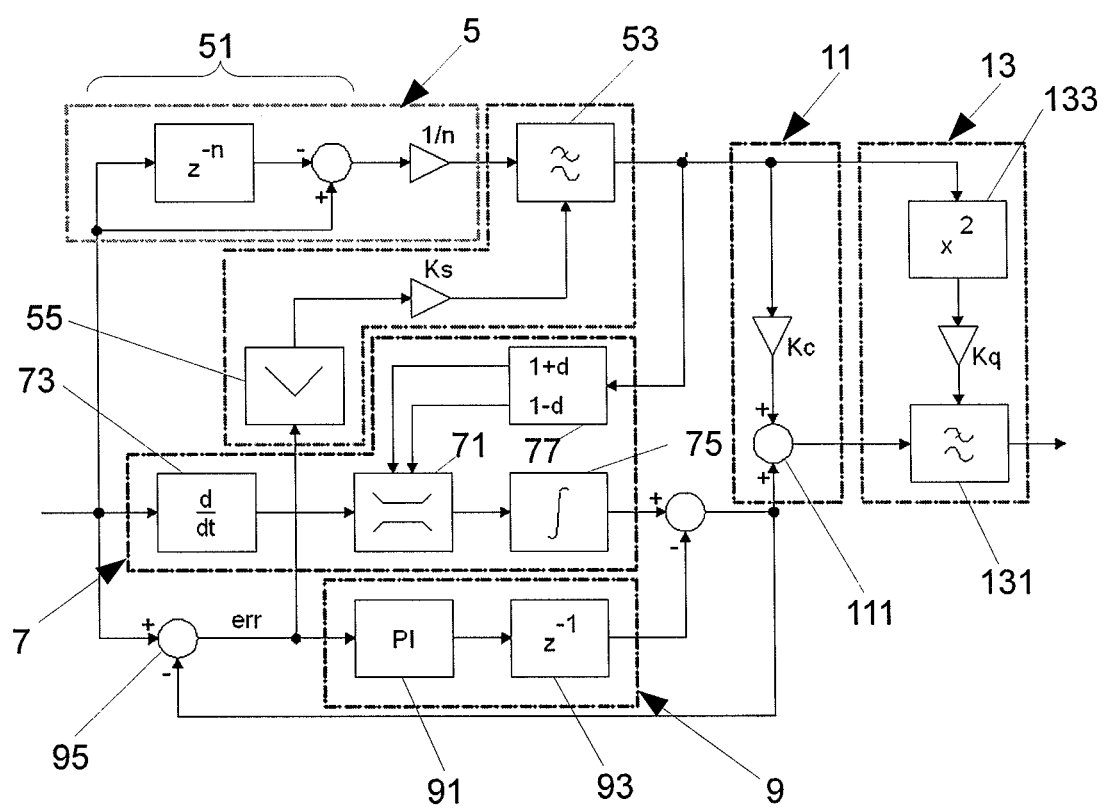

The invention disclosed will hereinafter be described in more detail and with reference to an exemplary embodiment depicted in the accompanying drawings, which show:

FIG. 1 a block diagram of an exemplary embodiment of a position measuring system with a capacitive encoder, FIG. 2. a block diagram of the digital processing means depicted in FIG. 1, FIG. 3 a more detailed embodiment of the digital processing means depicted in FIG. 2 and FIG. 4 a more detailed view of the digital processing means depicted in FIG. 3.

FIG. 1 shows a block diagram of an exemplary position measuring system, that is also called position encoder 1. The position measuring system comprises an capacitive angular position sensor 2 that provides a number of different capacities according to the position or the phase of the sensor 2. The capacitors of the capacitive angular position sensor are connected to an excitation generator 33, that feeds adopted excitation signal to the sensor 2. The charges generated thus generated on the capacitors are representative of the angular position of the sensor 2. A charge amplifier 21 that is connected in series to the sensor 2 amplifies the charges. An analog-digital converter (A/D-converter) 23 converts the analog charge signals gained into the digital domain. The output of the A/D-converter 23 is connected to a filter that provides a first digital filtering of the A/D-converted signal. The filtered digital signal is converted form the time domain into the frequency domain by discrete Fourier transformation means (DFT) 27. The so gained digital frequency signals in the present embodiment stand for sine and cosine of the phase/the angel to be measured. These digital signals are fed to digital signal processing means 3 after a notch filter 29 for the sine and the cosine path. After digital signal processing the so gained digital position signal is fed to an interface 31 that represents the link to e.g. a measuring and control center or further signal processing means.

The digital signal processing means 3 are discussed in more detail with reference to the following figures.

FIG. 2 depicts a block diagram giving an overview of the signal processing means 3. The digital signal processing is mainly performed in four blocks.

The digital position signal from the output of the notch filters 29 is fed to two parallely arranged blocks, a speed block 4 performing a speed estimation and noise reduction of the calculated speed, a position block 6 performing noise reduction of the position signal. As depicted in FIG. 2 the two blocks 4, 6 are fed with one position signal and not, as depicted in FIG. 1, two position signals i.e. sine and cosine of the phase/angle to be measured. The signal fed to these two blocks 4, 6 is the arctangent calculated form the aforementioned sine and cosine signals.

The speed block 4 and the position block 6 are both connected to a lag compensator 11, that compensates lag occurred during the signal processing particularly within the position block 6. The output of the lag compensator 11 is connected to a dynamic position filter 13 that performs dynamic filtering of the noise reduced and lag compensated position signal.

Although FIG. 2 depicts both, the lag compensator 11 and the dynamic position filter 13 it has to be mentioned that both blocks are optional and that an improved position signal may already be reached only with the speed block 4 and the position block 6.

FIG. 3 shows a more detailed view of the blocks depicted in FIG. 2.

The speed block 4 is embodied as a speed estimator 5. The speed estimator 5 contains a first differentiator 51 and a dynamic slope filter that is connected in series. The differentiator differentiates the position signal that is fed to its input and thus generates a signal representing the speed or the slope of the position signal from the position sensor 2. The dynamic slope filter 53 performs a dynamically controlled filtering of the signal fed to its input and provides a noise reduced speed/slope signal. The time constant of the dynamic filter is dependent on a position error the calculation of which will be described in more detail below.

The position block 6 exhibits a dynamic speed limiter 7 that dynamically limits the changes of the position signal fed to the position block according to the speed calculated within the speed estimator 5. The speed signal calculated in the speed estimator is fed to speed limiter 7 via a speed range calculator 77. The speed range calculator 77 calculates a range of position values that are possible at the current speed. The maximum and minimum values are fed to the speed limiter that performs a kind of damping of the position values, i. e. cutting the position values exceeding the calculated limits.

It is thus possible to dynamically limit the changes of the position signal according to the maximum possible changes at the calculated speed. With this approach excessive changes that are introduced e.g. by noise or disturbances can be filtered with good results. The signal path containing the dynamic speed limiter 7 is also referred to as the main signal path.

The position block 6 also exhibits a long term corrector 9 performing a correction of long term errors occurring within the dynamic speed limiter 7. The error occurring in the main signal path is calculated by error calculating means 95 by computing the difference between the output and the input of the speed limiter 7. The so gained error signal is fed to the long term corrector 9 that will be described in more detail below.

Both signals, the noise reduced speed signal from the speed estimator 5, and the noise reduced position signal from position block 6 are parallelly fed to the lag compensator 11. The lag compensator 11 exhibits summing means that calculate the sum of the noise reduced position signal and the noise reduced speed signal. Before summation the speed signal is multiplied by a first factor Kc that is depending form the lags within the different components particularly within the signal path before the digital signal processing means 3 but also within the main signal path of the digital signal processing means 3. Major influences on the value of the first factor are located in the bandwidth limitation of e.g. bandpass and decimation filters and the queue length of e.g. the discrete Fourier transformation means 27 and the notch filters 29.

For the digital components it has been found out that the influence is half of the queue length, thus a discrete Fourier transformation with a queue length of e.g. 8 samples has an influence of 4 on the first factor Kc.

The summation of the afore-mentioned components, i.e. the noise reduced position signal and the noise reduced and by the first factor Kc corrected speed signal performs a kind of extrapolation of the position according to the current speed. Provided that the first factor Kc has been accurately determined, the lag compensation works for both, the aforementioned effects and other time related effects, e.g. line delay.

Basis for the lag compensation in the present case however is the availability of the calculated or estimated speed or the slope of the position signal, respectively.

As depicted in FIG. 3 after the lag compensator 11 follows the dynamic position filter 13. The lag compensated position signal therefore is fed to an input of the dynamic position filter 13. Dynamic filtering of the position signal is performed with a dynamic low pass filter 131 whose time constant is dependent on the current speed signal. Therefore dynamic position filter 13 includes squaring means 133 that compute the square of the calculated or estimated speed, respectively.

It has to be noted that the squaring means 133 are not mandatory but may be replaced by any suitable means for processing the speed signal in an appropriate way for influencing the time constant of the dynamic low pass filter 131. However simulations showed best results when the time constant of the filter 131 depends from the time constant of the filter 131.

Although the present embodiments all show both the lag compensator 11 and the dynamic position filter 13 it has to be noted that improvements of the position signal without these optional components. Further improvements are possible with either one or both of the optional components.

FIG. 4 illustrates further details of the digital processing means depicted in FIGS. 2 and 3.

According to FIG. 4 the first differentiator 51 of the speed estimator may be embodied as a delay line with a feed forward of the input position signal. It is thus possible to calculate the slope/speed of the position signal, on basis of a queue of n samples. In order to compensate the distance of n samples between the current position signal and the delayed position signal an division by n has to be performed.

After differentiation the so gained signal that is representative for the slope of the position signal, respectively the speed, is fed to the dynamic slope filter whose time constant is dependent on the absolute value of the position error. Therefore absolute value means 55 are connected between the dynamic slope filter 53 and the error calculating means 95. The error calculating means 95 are fed with the output of the main signal path and the input thereto.

The speed limiter 7 is embodied as a dynamic clamping means 71 that is connected in series between a second differentiator 73 and an integrator 75. The differentiator 73 performs differentiation of the position signal fed to it and thus provides a signal representative of the slope of the position signal or the speed, respectively. The so obtained signal is fed to the dynamic clamping means 71 the clamping limits of which are determined by speed range calculator 77.

The speed range calculator is connected between the output of the speed estimator 7 that is also the output of dynamic slope filter 53 and the dynamic clamping means 71. The upper clamping limit may be computed e.g. by adding a constant value d to the current slope determined by the slope estimator, the lower clamping limit by subtracting the constant value, respectively.

Another possibility for calculation of the clamping limits is taking 120% of the calculated slope for the upper clamping limit and 80% for the lower clamping limit, respectively. Optionally a constant factor for compensation of acceleration that may occur may be added and subtracted, respectively. As generally the influence of acceleration is low, a constant factor of e.g. 0.003 is sufficient.

As after the clamping the signal is integrated again, the output of the speed limiter will be representative of the position. As signals within the clamping limits are restored without a change and excessive changes of the position signal (the slope thereof) are limited to the clamping limits a sufficient noise reduction may be achieved.

As indicated above a long term corrector 9 is connected in parallel to the main signal path.

The long term corrector 9 is built up by the error calculating means 95 for determination of the error occurring in the main signal path. Long term correction is achieved by feeding the error signal to a closed loop containing a proportional plus integral (PI) controller 91 followed by a delay line 93. The integral branch of the PI controller 91 can null errors also in case of linearly varying speed or constant acceleration, and the proportional branch may be trimmed to ensure the stability of the loop.

The output signal of the long term corrector 9 is subtracted from the output signal of the slope limiter 7. Thus errors occurring due to the asymmetry of the clamping in the main signal path may be compensated.

As indicated above the speed limiter 7 and the speed estimator 5 may be followed by lag compensator 11. The lag compensator according to FIG. 4 is designed as described as explained with reference to FIG. 3.

The lag compensator 11 further may be followed by dynamic position filter 13. The dynamic position filter 13 is designed as described with reference to FIG. 3. Additionally before feeding the squared speed signal to the dynamic the dynamic position filter 131 the signal is multiplied by a third factor Kq.

The signal gained that way is improved with respect to noise and lag. Further improvements may be achieved by dynamically adopting the factors Kc, Ks and Kq corresponding to the changes of the speed/slope signal. As these improvements however are small compared to the improvement of the general design, dynamic adoption of the factors currently seems not necessary.

LIST OF REFERENCE SIGNS

1 position encoder
2 position sensor
3 signal processing means
4 speed block
5 speed estimator
6 position block
7 dynamic speed limiter
9 long term corrector
10 summer
11 lag compensator
13 dynamic position filter
21 charge amplifier
23 analog-digital converter, A/D-converter
25 filter
27 discrete Fourier transformation means, DFT-means
29 notch filter
31 interface
33 excitation generator
51 first differentiator
53 dynamic slope filter
55 absolute value means
71 dynamic clamping means
73 second differentiator
75 integrator
77 speed range calculator
91 proportional plus integral controller, PI-controller
93 delay line
95 error calculating means
111 summing means
131 dynamic low pass filter
133 squaring means
Kc first factor
Ks second factor
Kq third factor

The invention claimed is:

1. Position encoder (1) for measuring a position containing:
a position sensor (2) configured to provide electrical signals representing angular position,
a measuring device for measuring the electrical signals and configured to output at least one electrical position signal representing the position, and
signal processing means (3) configured to process the position signal,
wherein the signal processing means (3) comprise at least a speed estimator (5) configured to output an estimated speed and a dynamic speed limiter (7) configured to limit a change in the position signal depending on the estimated speed by calculating a range of position values possible at a current speed, the dynamic speed limiter connected in parallel to the speed estimator (5),
and wherein the position signal is processed in parallel by the speed estimator (5) and the dynamic speed limiter (7).

2. The encoder (1) according to claim 1, wherein the speed estimator (5) comprises a first differentiator (51) configured to calculate the current speed from the position signal.

3. The encoder (1) according to claim 2, wherein the speed estimator (5) comprises a dynamic slope filter (53) connected in series to the first differentiator (51) and is configured to provide a noise reduced speed signal.

4. The encoder (1) according to claim 1, wherein the speed limiter (7) comprises a dynamic clamping means (71), having clamping limits determined from the output of the speed estimator (5), and configured to limit changes in the position signal depending on the estimated speed.

5. The encoder (1) according to claim 4, wherein the speed limiter (7) comprises a second differentiator (73) configured to receive the position signal and directly connected to an input of the dynamic clamping means (71).

6. The encoder (1) according to claim 5, wherein the speed limiter (7) further comprises an integrator (75), connected in series to the dynamic clamping means (71), and configured to output a noise reduced position signal.

7. The encoder (1) according to claim 1, wherein the signal processing means (3) further comprises correction means (9) configured to compensate for errors occurring within the speed limiter (7).

8. The encoder (1) according to claim 7, wherein the correction means (9) is a closed loop comprising at least a proportional plus integral controller (91).

9. The encoder (1) according to claim 3, wherein the dynamic slope filter (53) has a transfer function depending on an error occurring in the speed limiter (7).

10. The encoder (1) according to claim 1, wherein the signal processing means (3) further comprises a lag compensator (11) configured to compensate for a signal delay occurring within the dynamic clamping means.

11. The encoder (1) according to claim 10, wherein the lag compensator (11) is configured to calculate a sum of a noise reduced, error compensated position signal and a noise reduced speed signal multiplied by a first predefined factor Kc.

12. The encoder (1) according to claim 3, wherein the dynamic slope filter (53) is a dynamic low pass filter having a time constant depending on an error occurring in the speed limiter (7).

13. The encoder (1) according to claim 12, further comprising an absolute value means (55) configured to process the error signal including multiplying the error signal by a predefined second factor Ks and feed the processed error signal to the dynamic low pass filter (53).

14. The encoder (1) according to claim 1, further comprising a dynamic position filter (13), configured to receive the noise reduced position signal, and having a time constant depending on an output of squaring means (133) configured to receive the current speed, and wherein an output of the dynamic position filter is multiplied by a predefined third factor Kq.

* * * * *